United States Patent [19]

Oetiker

[11] Patent Number: 4,987,651
[45] Date of Patent: Jan. 29, 1991

[54] EARLESS CLAMP

[75] Inventor: Hans Oetiker, Horgen, Switzerland

[73] Assignee: Hans Oetiker AG Maschinen- und Apparatefabrik, Horgen, Switzerland

[21] Appl. No.: 409,798

[22] Filed: Sep. 20, 1989

[51] Int. Cl.⁵ .............................................. B65D 63/02
[52] U.S. Cl. ................................ 24/20 R; 24/20 CW; 24/20 EE
[58] Field of Search .............. 24/20 R, 20 CW, 20 W, 24/20 S, 20 EE, 20 LS, 19, 23 EE, 20 TT

[56] References Cited

U.S. PATENT DOCUMENTS

| 1,349,789 | 8/1920 | Schirra | 24/20 CW |
| 1,705,895 | 3/1929 | Blair | 24/20 CW |
| 3,189,961 | 6/1965 | Heller | 24/20 TT |
| 4,308,648 | 1/1982 | Fay | 24/20 CW |
| 4,402,113 | 9/1983 | Smith | 24/20 R |
| 4,492,004 | 1/1985 | Detiker | 24/20 R |
| 4,523,352 | 6/1985 | Wachter | 24/20 CW |

Primary Examiner—Victor N. Sakran
Attorney, Agent, or Firm—Paul M. Craig, Jr.

[57] ABSTRACT

An earless clamp structure to which elastic stretchability is imparted by one or more clamping band sections which essentially consist of lateral band portions converging toward one another from each end of the section. The lateral band portions define therebetween a window-like opening resembling an hourglass. The method in accordance with the present invention involves the step of removing certain material portions from the clamping band to obtain a section with nonrectilinear lateral band portions.

28 Claims, 2 Drawing Sheets

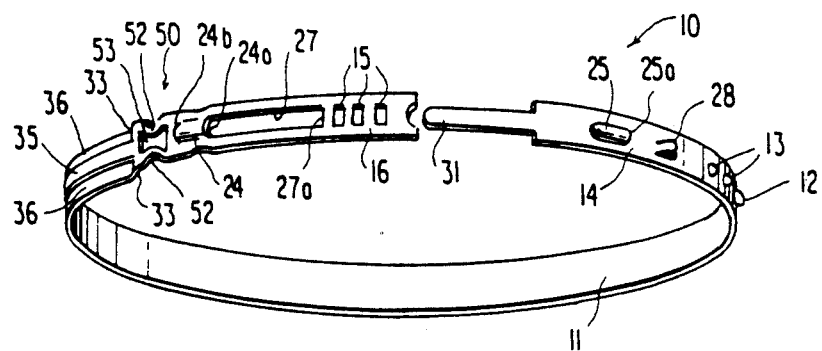
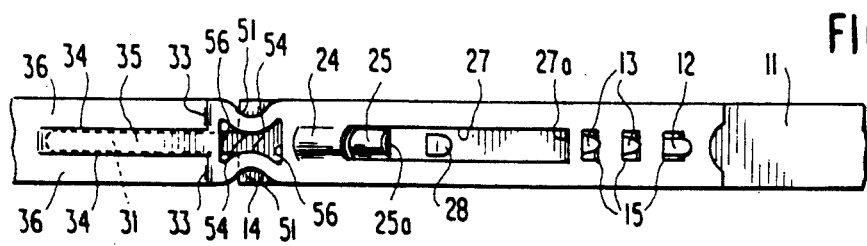
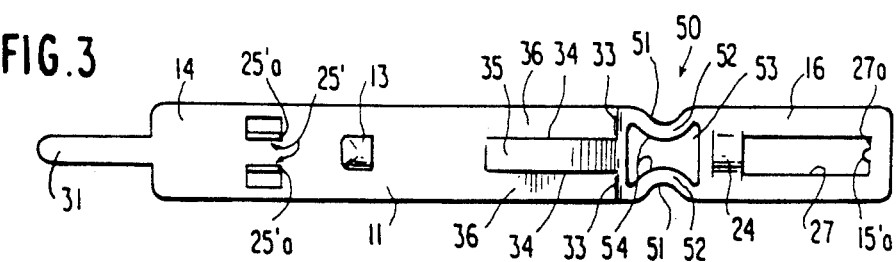
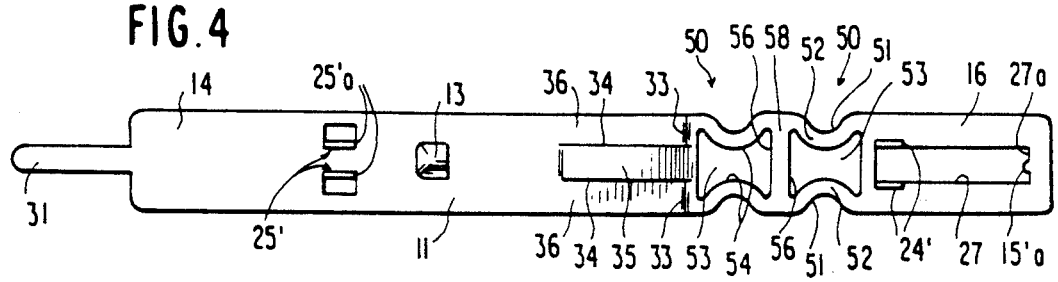

EARLESS CLAMP

FIELD OF INVENTION

The present invention relates to an earless clamp, and more particularly to an earless clamp exhibiting elasticity in the longitudinal direction of the clamping band.

BACKGROUND OF INVENTION

Earless clamps are known as such in the prior art. They are used in applications where space conditions do not permit the use of projecting parts, such as so-called "Oetiker" ears to tighten the clamp about an object to be fastened thereby. My prior U.S. Pat. No. 4,492,004 discloses a stepless, earless clamp which has proved highly successful. However, the prior art earless clamps entail certain disadvantages compared to clamps provided with so-called "Oetiker" ears. This is so as clamps provided with "Oetiker" ears provide for elastic compensation in the clamp to compensate for tolerances in the external dimensions of the hose and/or for changes in temperature and/or pressure of the medium flowing through the hose. The inherent elasticity in such clamp structures after plastic deformation of a socalled "Oetiker" ear is a significant advantage of their use under changing conditions.

By contrast, earless clamps of the type described in my U.S. Pat. No. 4,492,004 which are devoid of any elastic stretchability of the band material in its longitudinal direction have to be made accurately for predetermined hose dimensions and thus offer little latitude in their exacting design requirements and in practice provide compensation for dimensional tolerances of the hose only at the expense of the tightness of the installed clamp. Moreover, once installed over a hose, they provided no elastic compensation for changes in temperature and/or pressure.

OBJECT OF THE INVENTION

It is therefore a principal object of the present invention to provide an earless clamp of the type described above which avoids, by simple means, the aforementioned shortcomings and drawbacks encountered in the prior art and which offers an elasticity in the clamping band itself to compensate for changes in pressure and/or temperature.

SUMMARY OF THE INVENTION

The underlying problems are solved according to the present invention in that the clamping band is provided with one or more sections imparting to the clamping band elastic stretchability in the longitudinal direction of the clamping band. This is achieved by the removal of material in each such section of the clamping band, and more particularly in the center and along the sides thereof in such a manner as to leave non-rectilinear lateral band portions spaced from one another by a cut-out, window-like opening with the lateral band portions converging toward one another from each end of the window-like opening. This can be realized advantageously in a single stamping or punching operation in the course of which the window-like opening in the center of such a section is cut-out and band material is removed along the sides within the area of the window-like opening so as to leave the curvilinear lateral band portions. The window-like opening is preferably in the shape resembling an hourglass and the external sides of the lateral band portions are substantially parallel to the internal sides thereof defined by the shape of the window-like opening.

The width of the lateral band portions in a direction transverse to the longitudinal direction of the clamping band is less than 40% of the full clamping band width and preferably less than 30%. The width can be chosen as a function of the described elastic stretchability and the forces expected to occur in a given band material. Furthermore, the corners between each end surface of the window-like opening and the sides thereof are preferably rounded-off to minimize stress peaks.

A clamping band modified in accordance with the present invention surprisingly offers a considerable elastic stretchability in the longitudinal direction of the clamping band in the presence of tensional forces. This, in turn, will permit an earless clamping band to have inherent elasticity in the longitudinal direction so as to compensate for changes in temperature and/or pressure of the medium flowing through the hose.

The number of elastic stretchability imparting sections in accordance with the present invention can be chosen to satisfy the requirements in a given clamp, depending, inter alia, on size of the clamp, material of the clamping band, etc. The location of each such section can also be chosen at will to meet design requirements of the clamp. However, as the window-like opening or openings might permit a part of the hose to be squeezed out, the window-like opening or openings is or are preferably located in a stepless, earless clamp of the type described in my aforementioned prior patent, in the outer band portion of the overlapping ends within the area between the tool-engaging surface and the central channel adapted to receive a tongue-like extension provided at the free end of the inner band portion. In this manner, any window-like opening according to the present invention is effectively covered off by the overlapped inner band portion.

The method to impart elastic stretchability to the clamping band consists of removing from a preselected section of the clamping band an amount of material in its center and along its sides in such a manner that an opening in the center is defined by a pair of non-rectilinear lateral band portions which converge toward one another from each longitudinal end of the opening. The step of removing the material can be carried out in a single step by stamping or punching out the corresponding parts of the section of the band material. This stamping or punching operation can take place thereby at the same time as the punching or stamping-out operation normally performed on the flat blank of the clamping band to provide for the mechanical connection of the overlapping ends and for tightening of the clamp when being installed on an object to be fastened. The method to impart elastic stretchability to the clamping band is thus simple and basically does not greatly increase the cost of manufacture of the clamp as it only requires some changes in the dies.

The present invention thus assures inherent elasticity for an earless clamp to compensate for changes in temperature and/or pressure. Additionally, the present invention eliminates far-reachingly pre-existing problems due to dimensional variations of the hose, i.e., will accept larger tolerances in the hose diameters for a given clamp structure. This is so because the requirement for accurately matching the inner diameter of the clamp to the outer diameter of the hose, taking into consideration the elasticity of the hose material and the forces the connection is intended to withstand, can be reduced by the present invention. This means that an earless clamp in accordance with the present invention can be used with hoses having larger diametric tolerances than was possible heretofore, particularly also in connection with relatively hard hose materials as are used at present, for example, in connection with axle boots in the automotive industry.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a perspective view of an earless, stepless clamp structure in accordance with the present invention;

FIG. 2 is a plan view on the area of the mechanical interconnection of the earless clamp structure of FIG. 1, showing also the section of the clamp that imparts elastic stretchability;

FIG. 3 is a top plan view on a flat blank for a clamp structure of the type shown in FIG. 1 of my U.S. Pat. No. 4,712,278 modified to include the present invention;

FIG. 4 is a top plan view on a flat blank for a clamp structure of the type shown in FIG. 5 of my prior U.S. Pat. No. 4,712,278 modified to include the present invention;

DETAILED DESCRIPTION OF THE DRAWINGS

Figure 5:
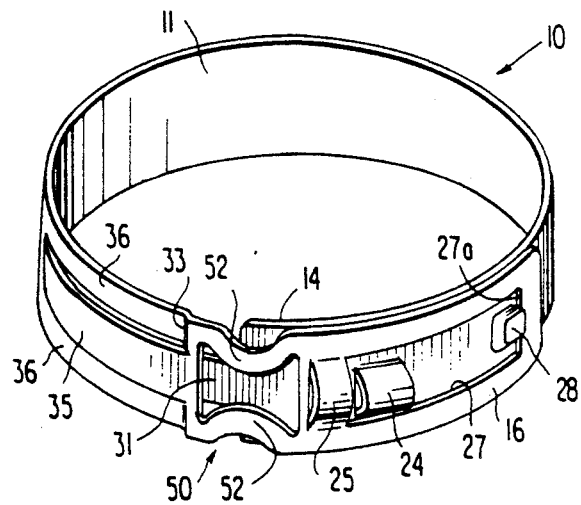
FIG. 5 is a perspective view of a still further modified embodiment of a stepless, earless clamp structure in accordance with the present invention, similar to FIG. 1, with the parts in the installed condition of the clamp structure.

Referring now to the drawing wherein like reference numerals are used throughout the various views to designate like parts, and more particularly to FIGS. 1 and 2, these figures illustrate a clamp of the type illustrated in FIGS. 1–8 of my aforementioned, prior U.S. Pat. No. 4,492,004. As similar reference numerals are used in this application as are used for similar parts in this patent, the details of the clamp, to the extent not shown in detail herein can be ascertained from this patent.

Reference numeral 10 generally designates in FIGS. 1 and 2 of this application an earless, stepless clamp structure which includes a clamping band 11 having open ends adapted to be mechanically interconnected when the clamp is installed on an object to be fastened. The mechanical interconnection is effected by an outwardly extending guide hook 12 and two cold-deformed support hooks 13 provided on the inner band portion 14 which are adapted to engage in apertures 15 provided in the outer band portion 16. The guide and support hooks 12 and 13 may thereby be constructed as disclosed in my prior U.S. Pat. No. 4,299,012. However, the present invention is equally applicable to any other type of mechanical interconnection suitable for withstanding the expected forces in the clamp structure. For example, in lieu of the guide hook 12 and the support hooks 13, also a single cold-deformed support hook 13 may be appropriate. In the alternative, the mechanical connection may also be constructed as disclosed in my prior U.S. Pat. Nos. 4,622,720 and 4,711,001.

To enable installation of the clamp by tightening the same about an object to be fastened, the outer and inner band portions 16 and 14 are provided with respective tool-engaging abutments 24 and 25. The tool-engaging abutments 24 and 25 are in the form of cold-deformed pressed-out embossments of at least approximately semi-circularly shaped cross section. The pressed-out tool-engaging embossment 24 in the outer band portion 16 is thereby essentially semi-cylindrical in shape, having transverse abutment surfaces 24a and 24b whereby its cylindrical walls are integral with the outer band portion 16 in the axial direction. The cold-deformed, pressed-out tool-engaging embossment 25 of the inner band portion 14 has only one tool-engaging abutment surface 25a and is integral with the inner band portion 14 substantially over its remaining contour. The outer band portion 16 is also provided with an elongated slot or opening 27 between its pressed-out embossment 24 and the apertures 15. The opening 27 is thereby of such a width that the pressed-out tool-engaging abutment 25 of the inner band portion 14 can extend therethrough. The inner and outer pressed-out embossments 25 and 24 are thereby of complementary dimensions and shape so that the pressed-out embossment 25 of the inner band portion 14 can slide underneath the pressed-out embossment 24 of the outer band portion 16 when the clamp is tightened by means of a tightening tool as disclosed in my aforementioned U.S. Pat. No. 4,492,004. The pressed-out hook 28 of any suitable shape and construction thereby serves as preassembly hook when it engages the transverse end wall 27a of opening 27.

To achieve a stepless internal surface of the clamp, the free end of the inner band portion 14 is provided with a tongue-like extension 31 adapted to engage in a tongue-receiving channel. The tongue-receiving channel is formed by pressing-out the central band portion 35 after making longitudinal cuts 34 and 34' starting at the step 33 so that lateral band portions 36 remain on both sides of the cuts 34 and 34'. The details of the clamp structure so far described correspond to those of my prior U.S. Pat. No. 4,299,012.

To impart elastic stretchability to the clamp structure in the presence of tensional forces, the clamping band 11 in accordance with the present invention includes a band section generally designated by reference numeral 50, which is so constructed and arranged as to impart to the otherwise essentially non-stretchable clamping band 11 limited elastic stretchability. More particularly, this is achieved by so punching or stamping-out the clamping band section 11 as to leave non-rectilinear lateral band portions 52. In the illustrated embodiment of FIGS. 1 and 2, a window-like opening 53 is provided which resembles an hourglass. The window-like opening 53 thereby defines the inner sides 54 of the lateral band portions 52 while their external sides 51 are obtained by cuts removing a more or less segmentally shaped area (FIG. 2). In the illustrated embodiment, the surfaces 54 and 51 thereby extend essentially parallel to one another so that the width of the lateral band portions is essentially constant. The more or less flat ends 56 formed by the window-like cut 53 pass over into the side surfaces 54 through rounded-off portions. The lateral band portions 52 thus converge toward one another from each end 56 of the window-like opening 53 in a manner gradually decreasing the converging steepness, as shown with the surfaces 51 and 54 of each lateral band portions 52 being of arcuate, concave shape as shown. When the clamp structure is subjected to tensional forces, for example, by increase of temperature or pressure, the non-rectilinear lateral band portions 52 will seek to straighten out, thereby permitting a stretching of the clamping band 11 in its longitudinal direction which, due to the elasticity, will cause the lateral band portions to return elastically to their original curvilinear shape.

In a clamp structure of the stepless type, as shown in FIGS. 1 and 2 of this application, it is preferable to locate the section or sections 50 imparting elastic stretchability to the clamping band within the area located between the embossment 24 and the step 33. The window-like opening 53 through which the rubber-like hose might be squeezed in operation, is thereby covered by the overlapped inner band portion 14.

FIG. 3 shows the present invention in use with a clamp structure of the type disclosed in FIG. 1 of my prior U.S. Pat. No. 4,712,278. Parts similar to corresponding parts of FIGS. 1 and 2 of this application are designated by similar reference numerals while primed reference numerals are used to designate those parts in FIG. 3 which differ from those in FIGS. 1 and 2 of this application.

Differing from FIGS. 1 and 2, the embossment 25 of FIGS. 1 and 2 has been replaced in FIG. 3 by two tab-like members 25' at least approximately symmetrically spaced with respect to the longitudinal center of the clamping band 11 so that nearly equal amounts of band material are left between respective openings and the corresponding longitudinal sides of the band. The tab-like members 25' are of approximately triangular shape as viewed in the axial direction of the clamp structure. However, they may also be of any other suitable shape which satisfies the requirements for withstanding the tightening forces and facilitates manufacture thereof. The tab-like members 25' are thereby so spaced that they can extend through aperture 27. Also differing from the mechanical connection consisting of the teeth 12 and 13 engaging in apertures 15 of FIGS. 1 and 2 of this application, the embodiment of FIG. 3 provides a mechanical connection by the use of a small projection 15'a located substantially in the center of the transversely extending end 27a of the opening 27. The small projection 15'a is thereby effective as guide and centering means for the engagement of the overlapping band portion and as additional locking means when the cold-deformed support hook 13 engages with its force-engaging surface against the transversely extending end 27a of the opening 27. So far, the clamp is similar to that of FIG. 1 of my prior U.S. Pat. No. 4,712,278. Differing therefrom, the clamp of FIG. 3 in accordance with the present invention includes a section generally designated by reference numeral 50, which, in the case of a stepless clamp, is preferably located between the embossment 24 and the step 33, to impart elastic stretchability to the clamp. The elastic, stretch-imparting section 50 can thereby be constructed similar to section 50 of FIGS. 1 and 2.

FIG. 4 which shows the application of the present invention to a clamp structure of the type shown in FIG. 5 of my prior U.S. Pat. No. 4,712,278, differs from FIG. 3 of this application by the replacement of embossment 24 of FIG. 3 by two tab-like members 24'. The means for imparting elastic stretchability to the clamp structure includes thereby two sections generally designated by reference numeral 50 which are constructed similar to those of FIGS. 1 and 2. The web portion 58 between the two sections 50, which forms adjacent ends 56 of the window-like openings 53, extends over the entire width of the clamping band 11 and has a width in the longitudinal direction of the clamping band substantially equal to the width of the lateral band portions 52 or greater than the latter.

Figure 6:
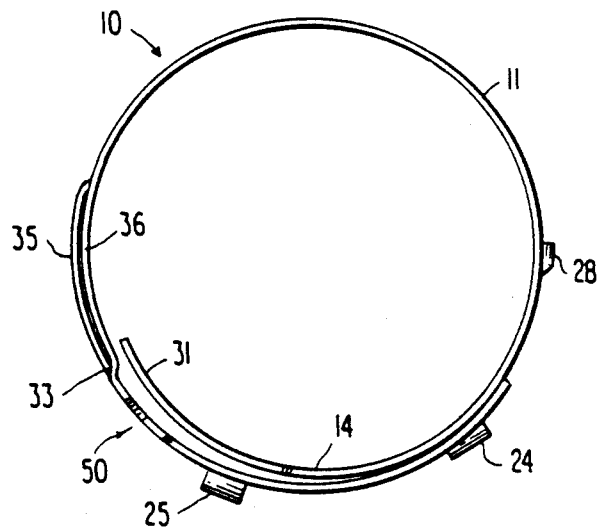
FIG. 6 is an axial view on the clamp structure of FIG. 5 in its preassembled condition.

FIGS. 5 and 6 illustrate a still further modified embodiment of a stepless, earless clamp in accordance with the present invention in which the embossment 25 also serves for purposes of preassembly of the clamp while the mechanical connection consists of a single cold-deformed support hook 28 cooperating with a projection (not shown) similar to projection 15'a of FIG. 3 of this application. The means for imparting elastic stretchability to the clamp which includes a section 50 similar to that shown in FIGS. 1 and 2 which is again located between the embossment 24 and the step 33 where the tongue-receiving channel 35 commences.

Figure 7:
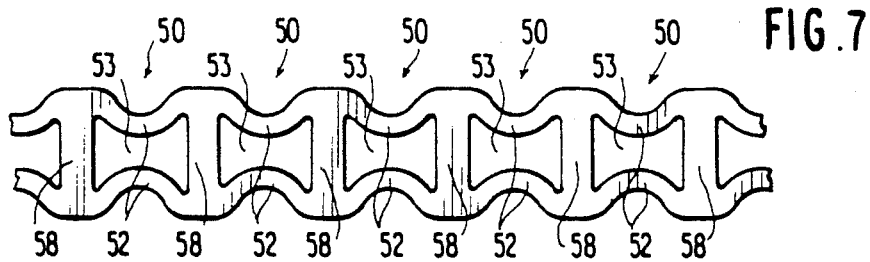
FIG. 7 illustrates a portion of a clamping band provided with several sections in accordance with the present invention to impart elastic stretchability to the clamp.

FIG. 7 illustrates a clamping band provided with several stretchability-imparting sections 50 of the type shown in FIGS. 1 and 2 of this application, the number of which is chosen depending on the amount of elastic stretchability desired for a clamp of a given size and made of a certain band material.

Figure 8:
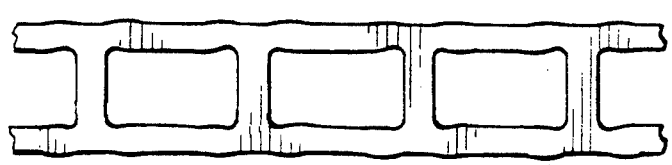
FIG. 8 illustrates a portion of a clamping band and the shape of the sections thereof if subjected to tensional forces beyond the elastic limit of the band material.

FIG. 8 illustrates a clamping band provided with three sections 50 which have been stretched beyond the elastic limit of the material of the clamping band. However, in actual repetitive tests, elastic elongation of a commercially available stainless steel band material could be obtained by the use of the present invention without adverse effect on the elasticity. The spring effect, i.e., maximum elastic elongation, depends on the number of sections 50 used in a clamp, the greater the number of sections 50, the longer 10 the spring path. An elastic elongation of 0.4 mm. could be obtained with a single section 50 and a spring path of 5 mm. with a corresponding number of such sections, all without any fatigue in the elasticity.

The method for imparting elastic stretchability to a clamping band is both simple and economical as it can be done in a single stamping or punching operation. This stamping or punching operation can thereby take place at the same time as the stamping or punching normally required for a flat blank to provide the necessary cuts, cut-outs and/or deformations in the clamp structure, for example, for the mechanical connections of the overlapping ends, etc. All that is necessary is to modify the die or dies used for such stamping or punching-out operation. The window-like opening 53 as well as the parts of the clamping band leaving the concave external side surfaces 51 can thereby be cut-out in one and the same operation.

While I have shown and described several embodiments in accordance with the present invention, it is understood that the same is not limited thereto but is susceptible of numerous changes and modifications. The number of elastic stretchability-imparting sections as well as the particular shape of the cut-outs can be varied to match the material and desired springiness of the clamping band. Furthermore, the configuration of the cut-outs, i.e., of the window-like opening and of the side surfaces of the sections 50 as well as the number in a given clamp structure can be chosen so as to obtain a desired elastic stretchability for a given clamp size. The window-like opening 53 as also the configuration of the sides 51 can be varied to achieve the particular desired characteristics. The change in convergence, respectively, divergence can also be varied depending on material and stretchability desired in a given clamp structure. Additionally, the sides 51 and 54 defining the lateral band portions 52 need not necessarily be parallel but can also be slightly non-parallel to achieve particular results. However, it is preferable if all transitions in internal and/or external surfaces of the sections 50 be smooth and curvilinear to avoid local stress concentrations. Additionally, the present invention can also be applied to any other part which is inherently non-stretchable in a given direction and to which elastic stretchability is intended to be imparted.

Thus, while I have shown several embodiments in accordance with the present invention, I do not wish to be limited thereto but intend to cover all such changes and modifications as known to those skilled in the art and as are encompassed by the scope of the appended claims.

I claim:

1. A clamp structure, especially a clamp structure of the earless type which comprises clamping band means having end portions adapted to overlap when the clamp structure is installed to provide an inner and an outer clamping band portion, mechanical connecting means operable to mechanically interconnect the inner and outer clamping band portions, force-engaging surface means in the inner and outer clamping band portions to enable the application of an external tightening force when installing the clamp structure on an object to be fastened thereby, and further means in the clamping band means itself to impart elastic stretchability to the clamping band means in its longitudinal direction so as to enable automatic compensation for changes in temperature and/or pressure by elastic changes in the length of the clamping band means, the further means including non-rectilinear lateral clamping band portions on both sides of the central longitudinal plane of the clamping band means which extend on a respective side of the central longitudinal plane of the clamping band means in such a manner that, as viewed in a direction transverse to the longitudinal direction, the lateral band portions extend in mutually opposite directions relative to the central longitudinal plane.

2. A clamp structure according to claim 1, wherein said further means are formed by at least one centrally disposed window means in the clamping band means.

3. A clamp structure according to claim 2, wherein a respecitve window means has a shape at least approximately resembling an hourglass.

4. A clamp structure according to claim 3, wherein all corners of an hourglass-like window means are rounded off.

5. A clamp structure according to claim 1, wherein the clamping band means is made from stainless or galvanized band steel material.

6. A clamp structure according to claim 5, wherein the sides of said clamping band means are curved concavely within the area of a respective window means.

7. A clamp structure according to claim 5, wherein each of the two side surfaces of said clamping band means are shaped to follow at least approximately the shape of the adjacent side of the window means.

8. A clamp structure according to claim 7, wherein two the lateral clamping band portions are formed between a respective side surface and the corresponding adjacent side of the window means, and wherein each of the two lateral clamping band portions is at least of approximately constant width over a substantial part of their length.

9. A clamp structure of the stepless type according to claim 6, which includes a tongue-like extension at the free end of the inner band portion and a tongue-receiving means commencing within the area of a step in the outer band portion and extending away from the step in a direction opposite the free end of the outer band portion, characterized in that the further means are located in the outer band portion within the area between the step and its force-engaging surface means so that the window means of the further means are covered internally by the overlapped inner band portion.

10. A clamp structure according to claim 1, wherein said further means are formed exclusively by cut-out means in the clamping band means.

11. A clamp structure according to claim 10, wherein said cut-out means include cut-outs in the center area of the clamping band means as well as along the sides of the clamping band means within the area of a respective cutout in the center area.

12. A clamp structure according to claim 1, wherein said clamping band means is made from relatively flat band material adapted to be bent into the shape of a clamp, and wherein the further means are formed by at least one pair of spaced lateral band portions in a section of the clamping band means itself and leaving therebetween an opening, wherein each of the lateral band portions is of a width less than half the width of the band material, and wherein the two lateral band portions of a respective pair are so shaped in the longitudinal direction of the band material that they converge toward one another to a point of minimum width in the opening and thereafter diverge from one another.

13. A clamp structure according to claim 12, wherein said lateral band portions have mutually oppositely directed, concave-like shapes, as seen in plan view.

14. A clamp structure according to claim 13, wherein the lateral band portions are of at least approximately constant width over a substantial part of their length in the longitudinal direction of the band means.

15. A clamp structure according to claim 14, wherein the lateral band portions of a respective pair are located at their points of maximum spacing substantially coincident with the full band width.

16. A clamp structure according to claim 15, wherein said further means includes at least two sections each with a pair of lateral band portions and a web portion disposed between each adjoining section.

17. A clamp structure according to claim 16, wherein the dimension of the web transverse to the longitudinal direction of the band means corresponds substantially to the full band width, and wherein the width of a web portion, as viewed in the longitudinal band direction, is at least approximately the same as the width of a lateral band portion, as viewed in a transverse band direction.

18. A clamp structure of the stepless type according to claim 13, which includes a tongue-like extension at the free end of the inner band portion and a tongue-receiving means commencing within the area of a step in the outer band portion and extending away from the step in a direction opposite the free end of the outer band portion, characterized in that the further means are located in the outer band portion within the area between the step and its force-engaging surface means so that the further means are covered internally by the overlapped inner band portion.

19. A clamp structure of the stepless type according to claim 1, which includes a tongue-like extension at the free end of the inner band portion and a tongue-receiving means commencing within the area of a step in the outer band portion and extending away from the step in a direction opposite the free end of the outer band portion, characterized in that the further means are located in the outer band portion within the area between the step and its force-engaging surface means so that the further means are covered internally by the overlapped inner band portion.

20. A method for imparting elastic stretchability to a relatively flat part essentially devoid of elasticity in its longitudinal direction, comprising the step of removing from a section of the part a predetermined amount of material in its center and along its sides in such a manner that an opening in the center is defined by a pair of non-rectilinear lateral portions which converge toward one another from each longitudinal end of the opening and which each have a width in a direction transverse to the longitudinal direction less than 40% of the width of the part whereby the application of a tensional force to the part in its longitudinal direction will impart elastic stretchability as the non-rectilinear lateral portions seek to become more rectilinear and upon removal of the tensional force will return to their preexisting more non-linear shape.

21. A method according to claim 20, wherein the flat part is a flat part cut to approximate length from band material; and wherein the step of removing is done by stamping or punching out portions of the section of the band material.

22. A method according to claim 21, wherein the band material is a steel band material as used for clamps.

23. A method according to claim 22, wherein the step of removing the predetermined amount of material is carried out at the same time as the cutting and removal of material required for the mechanical connection of the overlapping ends of the clamp and the tightening of the clamp about an object to be fastened thereby.

24. An earless clamp made by the method of claim 23.

25. A method according to claim 21, wherein the material removed in the center is in the shape of an hourglass-like opening.

26. A method according to claim 25, wherein each of the lateral portions is defined by two substantially parallelly extending surfaces.

27. A method according to claim 26, wherein at least two pairs of longitudinally spaced lateral portions are formed during the removing step which are spaced from one another by a web having the normal dimensions of the part in a direction transverse to the longitudinal direction and a width in the longitudinal direction of the part of the same order of magnitude as the width of the lateral parts.

28. A flat part having elastic stretchability in its longitudinal direction and made by the method of claim 20.

* * * * *